(12) United States Patent
Martinais

(10) Patent No.: US 8,181,347 B2
(45) Date of Patent: May 22, 2012

(54) GEOMETRICAL CONFORMATION UNIT

(75) Inventor: Bruno Martinais, Cintre (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 440 days.

(21) Appl. No.: 12/516,994

(22) PCT Filed: Mar. 3, 2008

(86) PCT No.: PCT/FR2008/050360
§ 371 (c)(1),
(2), (4) Date: May 29, 2009

(87) PCT Pub. No.: WO2008/122740
PCT Pub. Date: Oct. 16, 2008

(65) Prior Publication Data
US 2010/0059915 A1    Mar. 11, 2010

(30) Foreign Application Priority Data
Mar. 30, 2007    (FR) ..................... 07 54179

(51) Int. Cl.
*B23P 19/00* (2006.01)
*B21D 53/88* (2006.01)
(52) U.S. Cl. ........................ 29/897.2; 269/37
(58) Field of Classification Search ............ 269/37, 269/287, 289 R; 29/897.2
See application file for complete search history.

(56) References Cited

U.S. PATENT DOCUMENTS

| | | | |
|---|---|---|---|
| 4,827,598 A | 5/1989 | Sakamoto et al. | |
| 5,027,502 A | 7/1991 | Sakamoto | |
| 6,378,186 B1 * | 4/2002 | Angel | 29/281.1 |
| 6,389,698 B1 * | 5/2002 | Malatier | 29/897.2 |
| 6,438,842 B1 * | 8/2002 | Raami | 29/897.2 |
| 6,493,930 B1 * | 12/2002 | Raami | 29/783 |
| 7,744,514 B2 * | 6/2010 | Rossinger | 483/1 |
| 2004/0143951 A1 | 7/2004 | Berninger et al. | |

FOREIGN PATENT DOCUMENTS

| | | |
|---|---|---|
| BE | 889006 A1 | 9/1981 |
| EP | 1430989 A | 6/2004 |
| JP | 60135381 A | 7/1985 |

OTHER PUBLICATIONS

International Search Report in PCT/FR2008/050360 mailed Oct. 30, 2008.

* cited by examiner

*Primary Examiner* — David B Thomas
(74) *Attorney, Agent, or Firm* — Nicolas E. Seckel

(57) ABSTRACT

The invention relates to a geometrical conformation unit (1) for a vehicle, including: a frame (2) for receiving the vehicle body (5); two pairs of conformers ((12, 14), (13, 15)) to be attached on the frame symmetrically relative to the vehicle symmetry plane, each conformer (12, 14, 13, 15) including holding means (16) for maintaining the portion of the body opposite which said conformer (12, 14, 13, 15) is attached, each pair of conformers ((12, 14), (13, 15)) including a front conformer (12, 13) maintaining the front portion of the body (5) and a rear conformer (14, 15) maintaining the rear portion of the body (5).

12 Claims, 1 Drawing Sheet

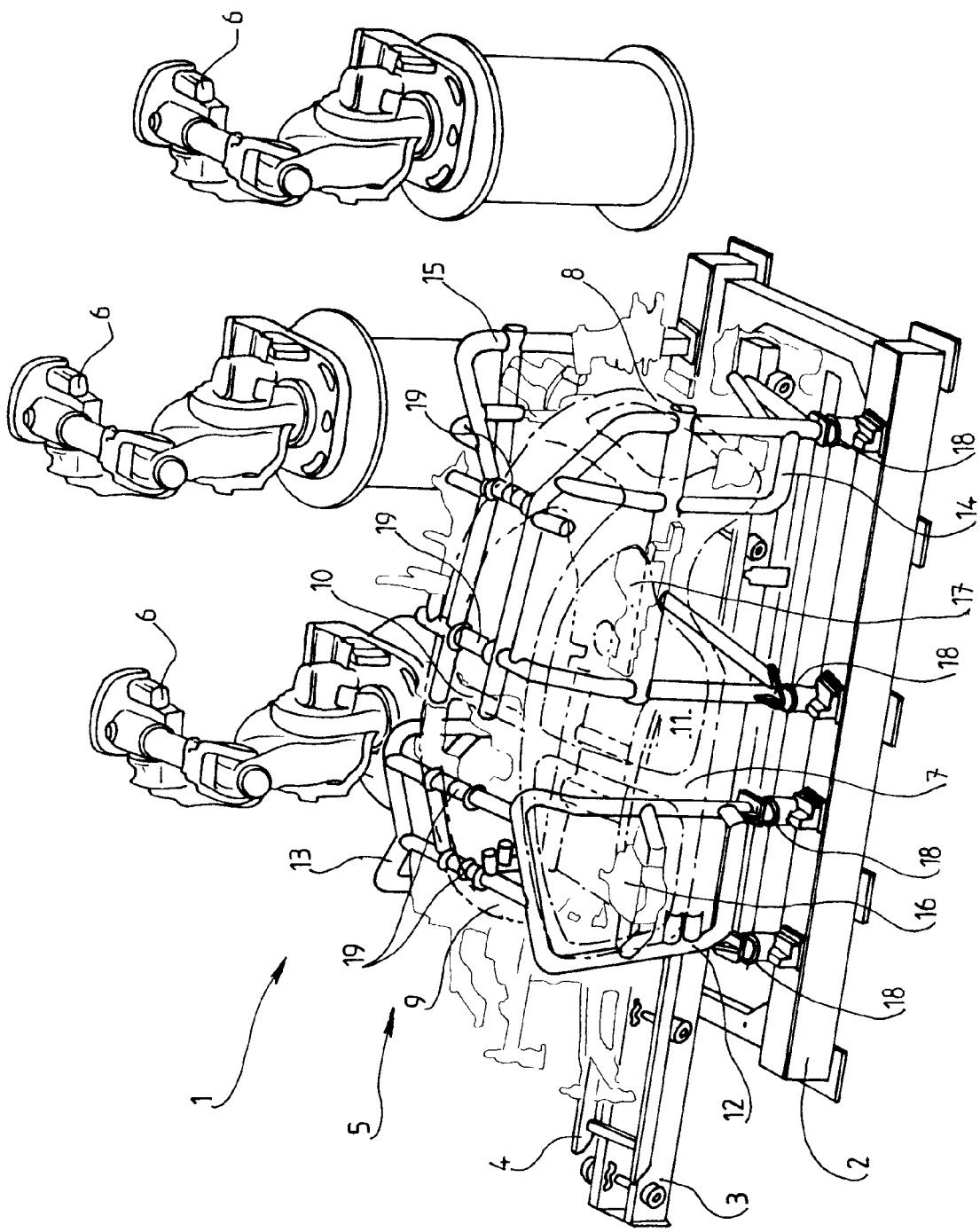

GEOMETRICAL CONFORMATION UNIT

BACKGROUND ART

The present invention relates to a geometric conformation unit for a motor vehicle body.

A vehicle body generally comprises an underbody, two body side frames, a rear panel, a rear shelf and cross-bracing. On the vehicle production line, these elements are all preassembled at a preassembly station using clips. The preassembled body then goes to a welding station where, in order to shape it geometrically, a conformation unit holds the various elements during welding.

Document EP-B-1084055 discloses an example of a geometric conformation unit comprising, firstly, a frame on which a cart holding the preassembled body is positioned and, secondly, a plurality of conformers. The set of conformers comprises a rear conformer that carries the rear panel, two lateral conformers, each of which carries a side of the body, and a top conformer that carries the roof panel and the cross braces. Each conformer comprises gripping and handling means for a robot, and clips for fastening the pertinent body part thereto. Each conformer is brought onto the frame by a robot and fastened thereto. Once the various conformers are positioned, the whole unit forms a shell with the body to be welded inside it. The overall size of such a unit does not make it easy for the welding robots to access the interior of the shell.

SUMMARY OF THE INVENTION

A purpose of the invention is to remedy the above-mentioned disadvantages by proposing a geometric conformation unit that is easier to use.

To this end, the present invention relates to a geometric conformation unit for a vehicle comprising:

a frame for receiving the vehicle body, two pairs of conformers to be fastened onto the frame symmetrically with respect to the symmetry plane of the vehicle, each conformer comprising holding means for holding the part of the body next to which said conformer is fastened, each pair of conformers comprising a front conformer holding the front part of the body and a rear conformer holding the rear part of the body.

Advantageously, each conformer comprises a first part extending vertically from the frame and a second part extending from the first part horizontally above the body toward the symmetry plane.

The geometric conformation unit preferably includes locking means for locking together the second parts of the front conformers, locking means for locking together the second parts of the rear conformers and/or locking means for locking the conformers onto the frame.

Advantageously, the rear conformers are designed to keep the access to the rear of the body clear.

According to a preferred embodiment, each conformer includes automatic tool changers capable of enabling a handling robot to grasp this conformer.

BRIEF DESCRIPTION OF THE DRAWINGS

The invention will be more easily understood, and other purposes, characteristics, details and advantages thereof will become clearer in the following explanatory description, written with reference to the attached schematic drawing, which is given only as an example illustrating an embodiment of the invention, and in which a geometric conformation unit according to the invention is shown.

DETAILED DESCRIPTION OF PARTICULAR EMBODIMENTS

A geometric conformation unit 1 according to the invention is shown in the sole FIGURE.

On a vehicle assembly line, the vehicle body 5 is taken through a preassembly step in which the various elements from which it is built are pre-positioned and clipped in place.

This body is positioned on a transport platform called a sled, with which it moves from station to station. When the body arrives at a station, there are two possibilities for positioning it:

the sled can be positioned using clamps and guides. This is known as multi-geometry, as each vehicle is positioned according to a different geometric arrangement due to the manufacturing tolerances of this sled, or the body can be set on guides and clamps, disengaging it from its sled via a lift table. This is known as mono-geometry, as each body is positioned in the station according to a single geometric arrangement.

In the example of the invention, the frame provided for receiving the vehicle body is equipped according to a monogeometric arrangement.

The body 5 shown in FIG. 1 comprises an underbody 11, two body side frames 7 and 9, a rear panel 8, a rear shelf and cross-braces 10.

The body 5 then goes to a welding station comprising at least one welding robot 6 via a cart 4 moved by handling means 3, which can take the form of a roller table, a "TMT" (modular roller transfer line), a self-propelled cart, or other forms.

The geometric conformation unit 1 is located at the welding station and comprises a frame 2 that serves as a geometric reference and receives the body 5 via the cart 4, which stops precisely on said frame 2.

Before the welding robots 6 go to work welding the various elements that form the body 5, they position conformers 12, 13, 14 and 15 of the unit 1 on the frame 2.

The conformers 12, 13, 14 and 15 are four in number and are divided into two pairs of conformers (12, 14) and (13, 15).

Each pair of conformers (12, 14), (13, 15) is arranged on one side of the longitudinal symmetry plane of the vehicle.

That is, the two pairs of conformers (12, 14) and (13, 15) are designed to be fastened onto the frame 2 symmetrically with respect to the symmetry plane of the vehicle.

When the conformers are locked, they form a rigid shell, geometrically referenced with respect to the frame 2 and inside which the body 5 is held during welding.

Each conformer here is made up of a structural framework of tubes, reducing the weight of the shell that they form once assembled together.

In order to hold the part(s) of the body 5 next to which it is fastened, each conformer 12, 13, 14, 15 comprises holding means, e.g., of the clamping type, that come and fasten onto the corresponding part(s) of the body 5.

Each pair of conformers (12, 14), (13, 15) comprises a front conformer 12, 13 for holding the front part of the body 5 and a rear conformer 14, 15 for holding the rear part of the body 5.

Such a unit 1 is easier to use, and separating it into four conformers makes it possible to free up some space, making it easier to get the welding clamps 6 inside the shell.

To facilitate the positioning of each conformer 12, 13, 14, 15 by a handling robot, automatic tool changers are disposed on each of the conformers 12, 13, 14 and 15.

Each handling robot can then take and position a conformer using the automatic tool changers. For each pair of conformers (12, 14), (13, 15), a space is kept clear between the front conformer 12, 13 and the rear conformer 14, 15.

Each front conformer 12, 13 extends substantially along the length of the front door opening. In the case of a vehicle with five doors, each rear conformer 14, 15 extends substantially from the middle of the rear door opening to the rear of the body 5.

Separating the two front conformers 12 and 13 and the two rear conformers 14 and 15 makes it possible to have lower investments in equipment for one vehicle line.

In fact, the front conformers 12 and 13 are common to the whole line. For each type of vehicle (5-door, 3-door, station wagon) in the line that has to be assembled, only the rear conformers 14 and 15 are different.

The particular structure of the unit 1 makes it possible to assemble all the elements that form the body 5 at a single conformation station.

Each conformer 12, 13, 14, 15 is fastened onto the frame 2 via fastening means 18, e.g., clamps.

All of the elements used to make the shell, as well as the actuators that produce the geometry of the body side frame, e.g., clamping, of the blank-die, guide support support, pliers, rotating clamps, multifunction guides, the holding means and the handling means are aboard the conformers 12, 13, 14 and 15.

In this way, removing the conformers after welding leaves no elements on the frame 2.

The space around the frame 2 is then completely clear, which gives better flexibility.

In order to provide the best coverage for the body 5, and particularly the roof panel and the crossbraces 10, each conformer 12, 13, 14, 15 comprises a first part extending vertically from the frame 2 and a second part extending from the first part horizontally above the body 5 toward the symmetry plane.

To make the shell more rigid, the geometric conformation unit 1 includes locking means 19 for locking together the second parts of the front conformers 12 and 13 and locking means 19 for locking together the second parts of the rear conformers 14 and 15. The locking means 19 can be in the form of clamps. A particularly appropriate clamping method is the ZPS type (Zero Point System, a trademark of the AMF company).

In order to facilitate access to the rear of the body 5, and particularly the rear panel 8 and rear shelf, the rear conformers 14 and 15 are designed to keep the access to the rear of the body 5 clear.

According to a particular embodiment, the first parts of the rear conformers 14 and 15 extend only along the length of the body side frames 7 and 9 in a plane parallel to the symmetry plane, and the second parts of the rear conformers 14 and 15 are oriented at an angle from the rear of the body 5 toward the front of the body 5, thereby substantially forming a V opening toward the rear of the body 5 as seen from above.

The present invention is not limited to the example of an embodiment described above, and may have various improvements and offer various advantages, including:

making a vehicle conformation unit that takes up little space, is light, inexpensive and suitable for positioning by robots provided for this purpose, using the same front conformers for the various vehicles in one line, fastening all of the actuators that produce the geometry onto the conformers, increasing welding accessibility at the rear of the vehicle when the conformers are in place, and increasing accessibility to the vehicle when the conformers are removed, given that these conformers are carrying the actuators, making it possible to assemble the various pieces of the body (front, middle, and rear cross braces, rear panel and shelf) at the same station, forming a rigid shell with the assembled conformers, which ensures low geometric dispersion of the body during welding through the use of our clamping systems.

The invention claimed is:

1. Geometric conformation unit for a vehicle, comprising:
a frame for receiving a vehicle body,
two pairs of conformers to be fastened onto the frame symmetrically with respect to a symmetry plane of the vehicle body, each conformer comprising holding means for holding a respective part of the vehicle body next to which said conformer is fastened, each pair of conformers comprising a front conformer for holding a front part of the vehicle body and a rear conformer for holding a rear part of the vehicle body, said conformers forming a rigid shell inside which the vehicle body is held,
wherein, at a bottom portion of the shell, each of the conformers is secured to the frame,
wherein, at a top portion of the shell, the front conformers are secured to each other and the rear conformers are secured to each other, and
wherein the front conformers and the rear conformers are not secured to each other at a top portion of the shell, so that the front conformers are separated from the rear conformers by a continuous free volume at a top portion of the shell.

2. Geometric conformation unit according to claim 1, wherein each conformer comprises a first part extending vertically from the frame and a second part extending from the first part horizontally above the body toward the symmetry plane.

3. Geometric conformation unit according to claim 2, which comprises locking means for locking together the second parts of the front conformers, locking means for locking together the second parts of the rear conformers and/or locking means for locking the conformers onto the frame.

4. Geometric conformation unit according to claim 3, wherein the rear conformers are devised so as to keep the access to the rear of the body clear.

5. Geometric conformation unit according to claim 4, wherein each conformer includes automatic tool changers capable of enabling a handling robot to grasp this conformer.

6. Geometric conformation unit according to claim 3, wherein each conformer includes automatic tool changers capable of enabling a handling robot to grasp this conformer.

7. Geometric conformation unit according to claim 2, wherein the rear conformers are devised so as to keep the access to the rear of the body clear.

8. Geometric conformation unit according to claim 7, wherein each conformer includes automatic tool changers capable of enabling a handling robot to grasp this conformer.

9. Geometric conformation unit according to claim 2, wherein each conformer includes automatic tool changers capable of enabling a handling robot to grasp this conformer.

10. Geometric conformation unit according to claim 1, wherein the rear conformers are devised so as to keep the access to the rear of the body clear.

11. Geometric conformation unit according to claim 10, wherein each conformer includes automatic tool changers capable of enabling a handling robot to grasp this conformer.

12. Geometric conformation unit according to claim 1, wherein each conformer includes automatic tool changers capable of enabling a handling robot to grasp this conformer.

* * * * *